Figure 1:
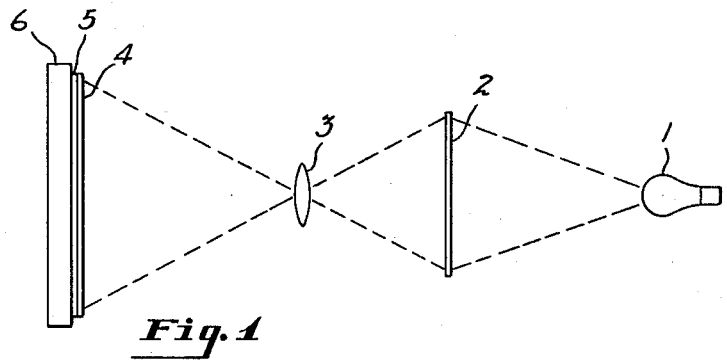

Nov. 24, 1964 P. PLUESS 3,158,479
METHOD OF PRODUCING HALFTONES
Filed March 14, 1963

INVENTOR
*Paul Pluess*
BY *McCoy, Greene & Te Grotenhuis*
ATTORNEYS 3,158,479
METHOD OF PRODUCING HALFTONES
Paul Pluess, Lakewood, Ohio (% Pluess Lithograph Co., 1125 Rockwell Ave., Cleveland, Ohio)
Filed Mar. 14, 1963, Ser. No. 274,365
5 Claims. (Cl. 96—45)

This invention comprises a novel simplified method for producing improved halftone screen negatives and positives useful in single-color and multiple-color lithograph, letterpress and gravure reproductions.

The use of halftone screens is now well known in the preparation of printing plates from continuous-tone photographic negatives and positives. Halftone screens can be made of glass which is lined and arranged to produce a network consisting of a series of parallel lines crossed usually at 90° by another series of parallel lines. The lines are opaque and preferably so situated that the free spaces are essentially square, essentially of equal size and essentially equally spaced. A continuous light image transmitted through such a screen onto a sensitized surface forms an image made up of dots. The dot image is somewhat softened by placing the glass screen a short distance from the sensitized surface resulting in dots each having a slightly indistinct or soft outline.

A more recent development is the contact screen which has a pattern of vignetted dots each of which represents an area that varies in density from the middle of the dot to the middle of the clear area. The contact screen is so named because the dots on the screen are in contact with the sensitized surface whereas a glass screen does not touch the sensitized surface. Contact screens are much less expensive than glass screens and must be used with cameras having a vacuum back.

In the projection of an image, light can be either transmitted through a transparency or reflected from an opaque piece of copy. The size of the dots which are produced on the sensitized surface varies according to the different amounts of light reflected from or transmitted through the different tones in the original. When adjacent image tone values are very close, the halftone screen sometimes cannot produce the necessary contrast to separate them and blends them into a single tone area. Originals containing middle tones such as soft gray as well as originals containing extreme contrast have not heretofore lent themselves to good quality halftone reproduction.

Many efforts have been made through the years to modify techniques and equipment to improve halftone reproductions. One technique has been to concentrate the dots by the use of finer screens. This was found to improve middletones at the expense of highlights resulting in a flat reproduction. Added contrast has been attained with contact screens by moving the dots away from the sensitized surface either by turning the screen over and projecting a light image through the back of the screen or by inserting a clear piece of film between the contact screen and the sensitized surface. Modifying tones have been introduced, for example, by flashing, by multiple stop exposures giving varying dot sizes, shapes and arrangements with varying exposure times, by large aperture exposures, by supplementary line exposures, by constantly moving the screen a small amount during exposure and by the overlay mask method. Most of these methods require special equipment and/or additional handling steps that take an undesirable amount of time from usual production schedules and produce questionable reproductions.

One of the objects of this invention is to provide in the preparation of halftone negatives and positives a modification which increases the depth of the reproduction as well as its tonal range. Another object is to provide such a modification which makes possible excellent halftones of originals having soft middle or gray tones and/or extreme contrasts. Another object of this invention is to provide such a modification which does not require special equipment and which is easily adapted to the regular routine of production schedules. Another object is to provide such a modification which requires only a negligible amount of additional time in the preparation from a continuous-tone image of a halftone image on a sensitized plate. Another object of this invention is to provide such a modification which results in a halftone image on a negative or positive which is not soft and fuzzy.

The most common printing plates used today in halftone reproduction are lithographic plates. While the most common of these are albumin or surface plates, there is an ever-increasing use of the so-called "deep etch" plates. Deep etch plates have recessed images and therefore withstand abrasion better than albumin plates. They are protected by a lacquer which is tougher than the light-hardened coatings of albumin plates. Furthermore, deep etch plates are easier to desensitize, making possible finer plate grains requiring less moisture in printing and yielding better quality halftones. They are made from positives, and tone values, which can be varied in developing plates, are easier to judge and control on positives than on negatives.

Another object of this invention is to provide a modification in the preparation of halftones which is easily adaptable to the preparation of positives useful in the preparation of photolithographic plates, especially deep etch plates. These objects are satisfied by this invention.

This invention includes the method which comprises projecting a continuous-tone light image through a halftone screen onto a sensitized surface for one exposure, then turning the screen in its plane through an angle of from about 28° to about 37°, again projecting the light image through the halftone screen onto the sensitized surface for another exposure and then fixing the resulting image on the sensitized surface.

The accompanying drawing serves to explain this invention. FIGURES 1, 2, 3 and 4 are diagrams illustrating respectively a typical arrangement of components for the preparation of a halftone positive and various angles for halftone dot patterns.

In FIGURE 1 a light source 1 passing through a continuous-tone negative transparency 2 projects a light image through a camera lens 3 and through a contact halftone screen 4 onto a sensitized surface, generally of a transparent film 5, both screen 4 and film 5 being held in contact with each other and flat against the camera back 6 by a vacuum.

Figure 2:
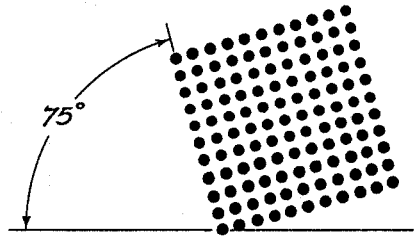
Figure 3:
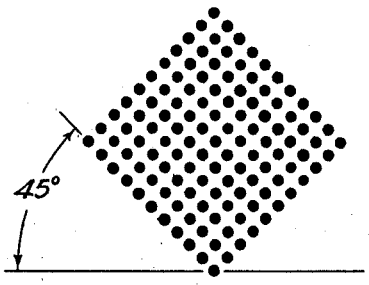
Figure 4:
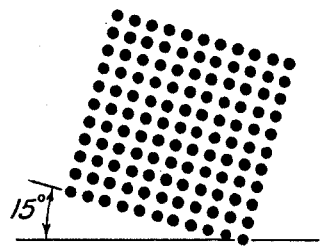

In FIGURES 2, 3 and 4 typical standard dot patterns, greatly magnified, are illustrated at specific angles from the horizontal such that any two dot patterns have an angle difference of 30° and a screen having or producing such patterns can be used in this invention. Screens having or producing dot patterns with the angles illustrated are preferred. However, only screens, glass or contact producing dot patterns varying in angles from about 28° to about 37° are operative.

In a typical operation a contact screen 4 having a dot pattern shown in one of FIGURES 2, 3 and 4 is employed in the arrangement shown in FIGURE 1. An image can be produced by passing light through a transparency or by reflecting light off a print. The image is projected through the lens 3 and the screen 4 onto the sensitized surface of film 5, i.e., the film is exposed, for a time equal to about one-half of the calculated total necessary exposure time for a satisfactory single exposure reproduction. The exposure is stopped and the contact screen 4 is replaced by another contact screen having a dot pattern shown in one of FIGURES 2, 3 and 4 but different from that employed during the first exposure. This is equivalent to turning the first screen. The exposure is then completed, and the resulting image is fixed on the sensitized surface in this case by developing the film to give a positive transparency suitable for use in the preparation of lithograph plates by standard techniques.

Simple cameras such as that described above or more elaborate cameras such as that described in U.S. Patent 2,981,625, can be employed. The latter type of camera can employ a circular screen which can be turned. Where such a screen is suspended so that it can be turned in its plane quickly, e.g., no more than about five seconds, through an angle of from about 28° to about 37°, preferably about 30° to 35°, it is possible change the screen position without actually stopping the exposure or affecting the ultimate result. However, this modification is in fact equivalent to stopping the exposure between screen positions.

The angle change of from about 28° to about 37° for the halftone screens as employed in the method of this invention is critical in that angle changes of less than about 28° create moire patterns while angle changes in the range of 45° produce regular distracting patterns, both of which are unsatisfactory for commercial halftone production. The preferred angle change commercially is about 30°.

If the method of this invention is employed to prepare a negative halftone transparency, it is only necessary to substitute a continuous-tone positive transparency for the negative transparency 2 in FIGURE 1.

The method of this invention is useful in producing positives and negatives from which halftone plates and halftones can be prepared having excellent shading and depth although using only one color of ink or other printing pigment. The preparation of a halftone plate from a positive or negative is well known as is the printing of the halftone.

It should be obvious that the method of this invention can be used in multiple-color lithography by preparing at least one and preferably each color plate by well known procedures from a negative or positive prepared by the method of this invention. The resulting multiple color reproduction has much improved shading, depth and detail as compared to previously known halftone multiple-color reproductions.

What I claim is:

1. The method which comprises projecting a continuous-tone light image onto a light-sensitive surface through a halftone screen for one exposure, turning the screen in its plane through an angle of from about 28° to about 37°, again projecting the image on the light-sensitive surface through the screen in its new position for another exposure and developing and fixing the exposed light-sensitive surface.

2. The method which comprises projecting a continuous-tone light image onto a light-sensitive surface through a halftone screen for one exposure for a period of time equal to about one-half of the time necessary to achieve a satisfactory single exposure reproduction, turning the screen in its plane through an angle of from about 28° to about 37°, again projecting the image on the light-sensitive surface through the screen in its new position for another exposure for a period of time equal to about one-half of the time necessary to achieve a satisfactory single exposure reproduction and developing and fixing the exposed light-sensitive surface.

3. The method of preparing a transparency for use in photolithography which comprises projecting a continuous-tone light image through a halftone screen onto the light-sensitive surface of photographic film, stopping the projecting, turning the screen in its plane through an angle of from about 28° to about 37°, again projecting the image through the halftone screen onto the light-sensitive surface and developing and fixing the exposed film.

4. The method of preparing a transparency for use in photolithography which comprises projecting a continuous-tone light image through a halftone screen onto the light-sensitive surface of photographic film for a period of time equal to about one-half of the time necessary to achieve a satisfactory single-exposure reproduction, stopping the projection, turning the screen in its plane through an angle of form about 28° to about 37°, again projecting the image through the halftone screen onto the light-sensitive surface for a period of time equal to about one-half of the time necessary to achieve a satisfactory single-exposure reproduction and developing and fixing the exposed light-sensitive surface.

5. The method of preparing an improved halftone positive transparency for use in photolithography which comprises projecting a continuous-tone negative light image through a halftone screen onto the light-sensitive surface of photographic film for a period of time equal to about one-half of the time necessary to achieve a satisfactory single-exposure reproduction, stopping the projection, turning the screen in its plane through an angle of from about 28° to about 37°, again projecting the image through the halftone screen onto the light-sensitive surface for a period of time equal to about one-half of the time necessary to achieve a satisfactory single-exposure reproduction, stopping the projection and developing and fixing the exposed film.

References Cited in the file of this patent

UNITED STATES PATENTS

| | | |
|---|---|---|
| 1,524,499 | Bassini | Jan. 27, 1925 |
| 1,577,442 | Bassini | Mar. 23, 1926 |
| 2,703,281 | Consual et al. | Mar. 1, 1955 |
| 2,776,595 | Schumacher | Jan. 8, 1957 |
| 3,085,878 | Archer | Apr. 16, 1963 |

FOREIGN PATENTS

| | | |
|---|---|---|
| 881,742 | Great Britain | Nov. 8, 1961 |